United States Patent

[11] 3,603,996

| [72] | Inventors | Jerre M. Murchison;<br>Alexander G. Antonio, both of Fort Worth, Tex. |
|---|---|---|
| [21] | Appl. No. | 752,733 |
| [22] | Filed | Aug. 9, 1968 |
| [45] | Patented | Sept. 7, 1971 |
| [73] | Assignee | General Dynamics Corporation<br>Fort Worth, Tex. |

[54] MEANS AND METHOD FOR DETECTING DOPPLER SIGNALS SUBMERGED IN CLUTTER
13 Claims, 4 Drawing Figs.

[52] U.S. Cl. .................................................. 343/7.7, 343/9
[51] Int. Cl. .................................................. G01s 9/42
[50] Field of Search .......................................... 343/7.7, 9

[56] References Cited
UNITED STATES PATENTS

| 2,678,440 | 5/1954 | Watt ............................ | 343/7.7 |
| 3,024,456 | 3/1962 | Varion et al. ................ | 343/9 X |
| 3,079,599 | 2/1963 | Caspers ...................... | 343/9 UX |
| 3,168,735 | 2/1965 | Cartwright .................. | 343/9 X |
| 3,229,284 | 1/1966 | Rubin .......................... | 343/7.7 X |

Primary Examiner—T. H. Tubbesing
Attorney—Charles C. M. Woodward

ABSTRACT: A subclutter, personnel detection coherent pulsed doppler radar system for discerning doppler signals submerged in clutter incorporating range gating, clutter rejection and clutter cancellation for use in a highly foliated environment, the received returns gated to eliminate all but those from the surveillance bin at a preselected range, the antenna pattern shaping the resolution cell in both azimuth and elevation. A filter system limits undesired received signals, the passed signal being separated into separate channels for receding or approaching targets, the outputs of the channels being subtracted and then integrated. Since foliage movement is fixed but pliable, the received clutter signal therefrom will integrate to zero voltage level, while with signals received from a target exhibiting continuous radial motion, the doppler signal will integrate to a level which may be displayed or recorded.

JERRE M. MURCHISON
ALEXANDER G. ANTONIO

INVENTORS

JERRE M. MURCHISON
ALEXANDER G. ANTONIO

INVENTORS

JERRE M. MURCHISON
ALEXANDER G. ANTONIO
INVENTORS

MEANS AND METHOD FOR DETECTING DOPPLER SIGNALS SUBMERGED IN CLUTTER

The present invention relates generally to a means for detecting continuous radial motion submerged in clutter and is applicable to any system which detects amplitude and frequency of a returned signal containing doppler information, through detection of a doppler effect while disregarding any movement of an object which is fixed but pliable.

In personnel detection systems, particularly where large amounts of foliage are present in the target area, it has been relatively impossible for radar systems to differentiate between the natural movement of such foliage and that of a target, the former almost invariably obscuring or dominating all other movement. This inability is of particular criticality in perimeter control and defense, and particularly in situations where the vegetation in target areas cannot be identified or eliminated.

It is an object of the present invention to provide a radar system which gives advance warning in any weather conditions of movement in a selected target area (such as personnel infiltration of land-based operations) in dense foliage or other environments normally disruptive of microwave radiation.

It is a further object to provide such a radar system which is readily transportable and man-carryable, rugged and simple to operate regardless of the environment in which it must function.

It is a further object to provide a means for detecting continuous radial motion submerged in clutter by detecting doppler effect in a returned signal.

Until the present invention, no system has been capable of detecting a moving target in a highly foliated or otherwise cluttered area when target movement is the same velocity as foliage or clutter movement. This has been due in part to the relatively infinitesimal "quantity" of target echo return relative to the returns reflected by the foliage or vegetation surrounding the target. Many doppler radars have "subclutter visibility" but none have solved the problem obviated by applicants' invention. Although infrared and other devices have been utilized because of some of these problem areas, such environments attenuate to a marked degree and at a rapid rate the radiated energy upon which such devices must operate, thus materially precluding the penetration in a target area necessary for effective use of such warning systems.

The invention will be readily understood by those skilled in the art in view of the following specification describing in detail preferred embodiments of one application of the invention, when taken in conjunction with the drawings, wherein.

Figure 1:
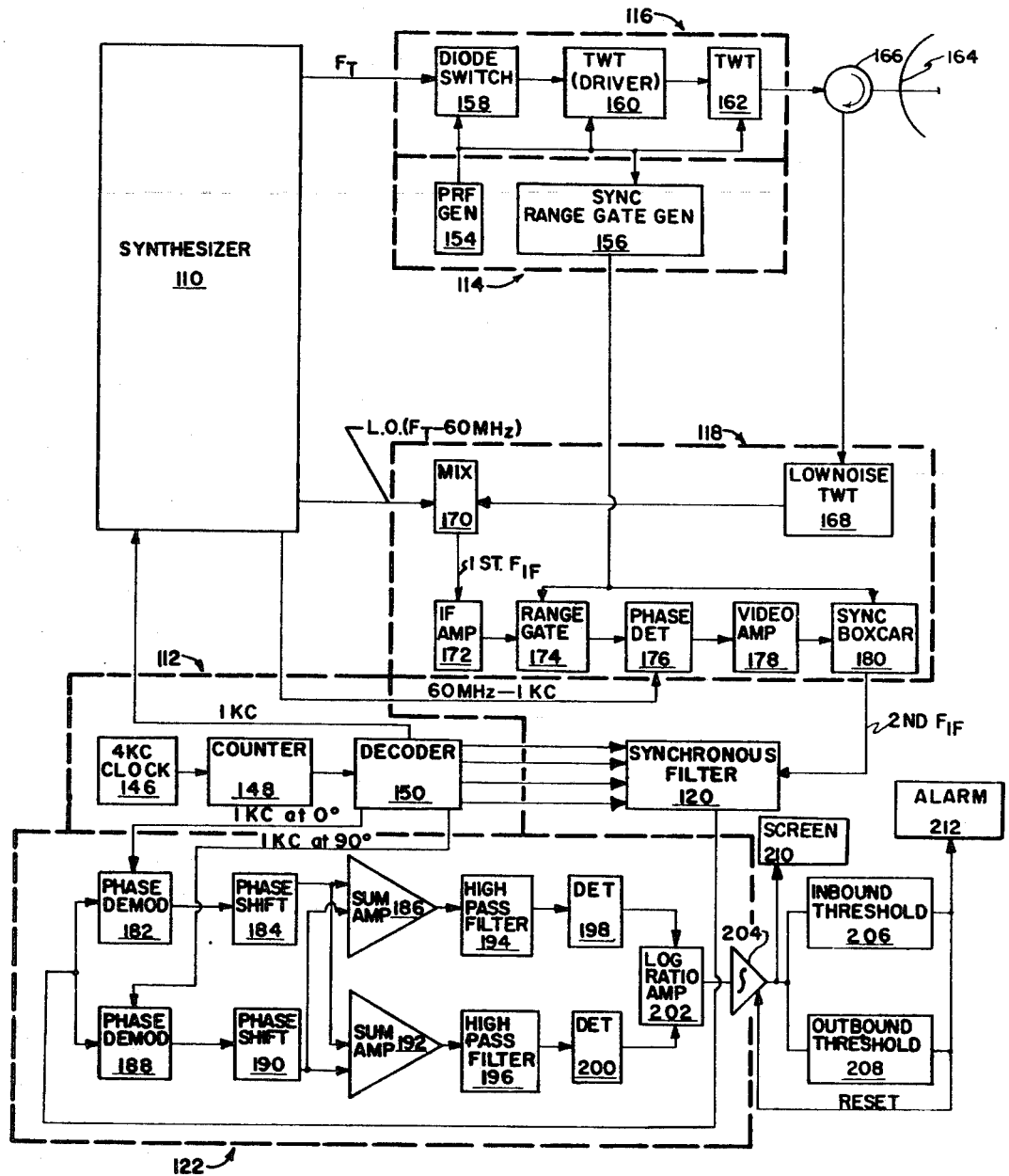
FIG. 1 is a schematic illustration, in block diagram form, of the preferred embodiment of the invention incorporated in a coherent, pulsed doppler radar system.

Referring to FIG. 1 for orientation, the preferred embodiment comprises a synthesizer 110 providing three basic coherent signals: (1) a master oscillator or transmitter signal ($F_T$) absolutely stabilized at the frequency to be transmitted; (2) a local oscillator signal absolutely stabilized at a frequency offset from the master oscillator signal by the intermediate frequency amplifier frequency ($F_T$—60 MHz), the offset accomplished by phase locking the local and master oscillators to a crystal controlled intermediate frequency reference in an obvious manner; and (3) a phase locked synthesizer phase detector reference signal absolutely stabilized at a frequency offset from the IF crystal controlled reference (60 MHz—1 kc.), accomplished by phase locking the phase detector and IF reference to the synchronous notch filter and canceler reference signal frequency; clock 112 providing one basic coherent signal to (4) a synchronous notch filter and clutter canceler reference; a timing unit 114 providing two basic timing pulses: (1) the pulse repetition frequency and (2) the range gate timing pulse; a transmitter 116 providing a coherent pulsed transmitted signal; a receiver 118; a synchronous notch filter 120 and a clutter canceler 122.

Since the functions of the synthesizer 110 may be accomplished in several obvious ways, and are wholly within the state of the art, in order to simplify the disclosure no schematic is shown of the synthesizer itself, although the reference signal to the synthesizer from clock 112 is illustrated since it is necessary to achieve the synthesizer outputs. In addition, values have been ascribed to some of the outputs in an attempt to more clearly describe and illustrate the functions of the embodiment shown. It is apparent that different values and outputs may be utilized, and no limitation should be ascribed to the invention thereby. The drawing and specification are directed to a preferred embodiment, and it is obvious that the novel concept may be employed with different systems such as, for example, CW radar systems and sonar systems. Schematics of the timing unit 114, transmitter 116 and receiver 118 are shown for purposes of clarity but is also apparent that these are systems found in any coherent pulsed doppler radar system.

Timing unit 114 provides two basic timing pulses; the pulse repetition frequency (PRF) for the transmitter 116 and the range gate pulse for the receiver 118. The PRF is provided by PRF generator 154. This pulse also provides the synchronizing pulse to range gate generator 156.

Transmitter 116 gates the master oscillator signal $F_T$ from synthesizer 110 by diode switch 158 at the pulse repetition frequency established by PRF generator 154 of timing unit 114. The signal is then amplified by pulsed TWT driver 160 and TWT power amplifier 162 to produce the transmitted pulse, which is routed to the antenna 164 through circulator 166.

The received RF signals are routed from the circulator 166 to receiver 118 where they are converted to a 1-kHz. signal, which signal retains all the doppler information contained in the returned RF signal. This conversion is accomplished by passing the received signal through low noise TWT 168 to mixer 170 where it is heterodyned with the local oscillator signal ($F_T$—60 MHz) from synthesizer 110 to produce a first or 60-MHz IF frequency. This signal is then amplified in amplifier 172 and range gated in 174 by the range gate pulse from synchronized range gate generator 156 of timing unit 114. It should here be noted that the range gate generator is capable of generating a gate at any range within the interpulse period of the pulse repetition frequency of timing unit 114. This first IF range gated signal is then detected in phase detector 176, the output of which is a bipolar video signal modulated at a center frequency of 1 kHz. The reference frequency to phase detector 176 is absolutely stabilized to 1 kHz. below the IF center frequency (60 MHz) by use of the 1-kHz. reference signal in the synthesizer.

The 1-kHz. reference signal is generated in clock 112 by dividing the 4-kHz. signal from digital clock 146 by 4. The output signal of phase detector 176 is amplified by video amplifier 178 and then routed to boxcar generator 180 which stretches the video pulses in time to cover the entire pulse repetition period, thus emphasizing the fundamental modulation frequency and eliminating harmonics of the PRF.

The 4-kHz. signal from the clock 146 is also used to establish the 1-kHz. center frequency of the synchronous filter 120. The synchronous filter reference signals derived from clock 112 consist of four 1-kilohertz pulses, coherent to themselves, of one-fourth duty cycle and displaced consecutively by one-fourth duty cycle, establishing the 1-kHz. center frequency of filter 120, assuring that the 1-kHz. signal from receiver 118 is centered in the extremely narrow filter 120. The synchronous filter 120 rejects the 1-kHz. signal (stationary targets) but passes the 1-kHz.± doppler shift from inbound and outbound targets respectively. The operation and function of a synchronous filter is described in "Generation of Band-pass Filters by Switching Techniques," by A. Acampora, B. Rabinovici, "Proceedings of the IEEE," p. 256, Jan. 1963 and "Digital Filters With IC's Boost Q Without Inductors" by W. R. Hardin, "Electronics," pp. 91–100, July 24, 1967. Synchronous filter 120 need not be used for the device of the present invention but its employment increases detection performance of the system shown by about two orders of magnitude.

Thus, with filter 120, the input to canceler 122 is only the return from moving targets. The clutter canceler reference signals are coherent (1-kHz. signals derived from clock 112 and consist of two 1-kHz. signals displaced by 90° in phase. The clutter canceler 122 functions to process the returned signal to identify returns from targets having radial motion ("mobile" targets) from the returns of windblown foliage (clutter) producing the same doppler frequencies as the "mobile" targets. This is accomplished by separating the upper and lower sidebands by phasing-type demodulators 182–186, 188–192 of the kind used in single-sideband receivers used to reproduce audio signals, using the same 1-kHz. reference signal from clock 112 as the filter 120. These separated sidebands, which represent a function of the size and amplitude of the targets versus frequency, are processed through high pass filters 194, 196 whose slope is 6 db. per octave to achieve compensation so that the filter output voltage amplitude is proportional to distance travelled by the target, detectors 198, 200 and log ratio amplifier 202, thus causing the spectrum in each sideband to be velocity-weighted, detected and ratioed. Each sideband is then integrated, as at 204, with respect to time so that the output will be proportional to the net summation of the cross section of all targets and their displacement. When the targets are "fixed but pliable" objects the summation of the two sidebands will cancel to some predictable level over a given integration period, but if the target is "mobile" its return will add to only one of the two sidebands. The detection of this imbalance is the basis for the capability of detecting "mobile" targets in the presence of clutter or "fixed but pliable" targets which generate the same doppler frequencies as the "mobile" targets. Obviously, this in no way diminishes the ability of the canceler 122 to function conventionally when the target is outside the clutter spectrum or if no clutter exists. Since the output of clutter canceler 122 equals the difference in linear displacement of all inbound and outbound targets, a fixed threshold 206, 208 may be set for targets moving at all velocities of interest, that is, a man walking through the range gate will cause the integrator 204 to reach the same level as a man running through it. The resultant signal may then be displayed on a screen 210 to give a visual display of target position in both range and azimuth and may be in the form of a PPI presentation and/or in audible signal through an alarm as at 212 may be given. A digital printout on paper tape (not shown) may also be provided.

It is apparent that if it is desired to monitor more than one range bin simultaneously, additional like components are added to the system from range gate 174 on.

Figure 2:
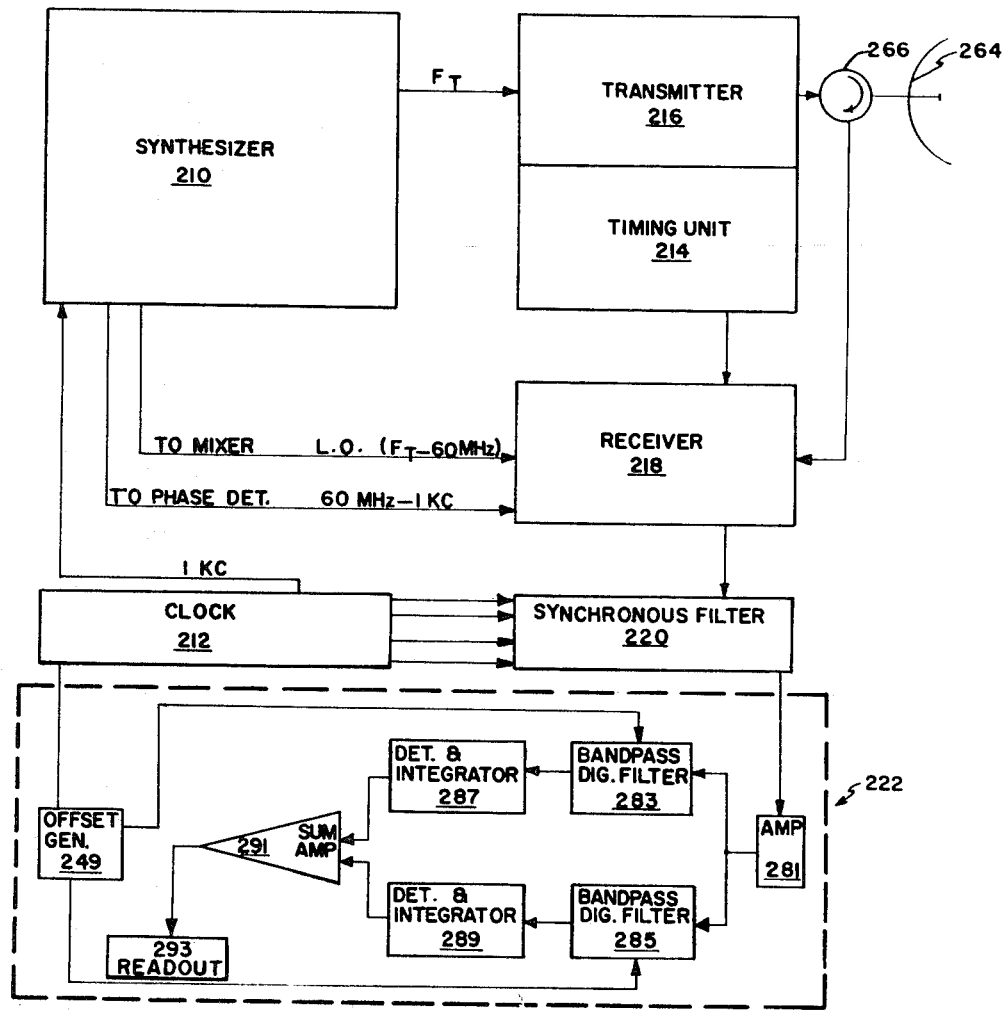
FIG. 2 is a schematic illustration, in block diagram form, of another embodiment of the invention applied to the radar system of FIG. 1.

Referring now to FIG. 2 generally, there is shown a system similar to that of FIG. 1, differing only in the method of implementing the canceler 222. The output of the synchronous notch filter 220 is passed through clutter canceler 222 which has a filter system whose center frequencies are equally displaced on either side of the 1-kHz. reference signal from clock 212. Any resultant signal is detected, integrated, summed and amplified and may be read out directly, printed out and/or cause the activation of alarm means.

Since the operation and function of synthesizer 210, clock 212, timing unit 214, transmitter 216, receiver 218 and synchronous filter 220 are the same as the first embodiment, their description will not be repeated.

In canceler 222, the signal is amplified at 281 and the amplified signal is fed to narrow band-pass digital filters 283 and 285. The center frequencies of filters 283 and 285 are controlled by digital offset generator 249 to values equally displaced above and below the 1-kHz. reference signal from clock 212. The filter outputs are detected, one positive and the other negative, and then integrated, at detector and integrator 287, 289 and the outputs summed at summation amplifier 291. If only clutter or "fixed but pliable" movement is present, the compared output of amplifier 291 will be zero. If, however, continuous radial motion is present, one of the integrators will have a higher output than the other and the output of the summation amplifier 291 will so indicate, as at readout 293.

Figure 3:
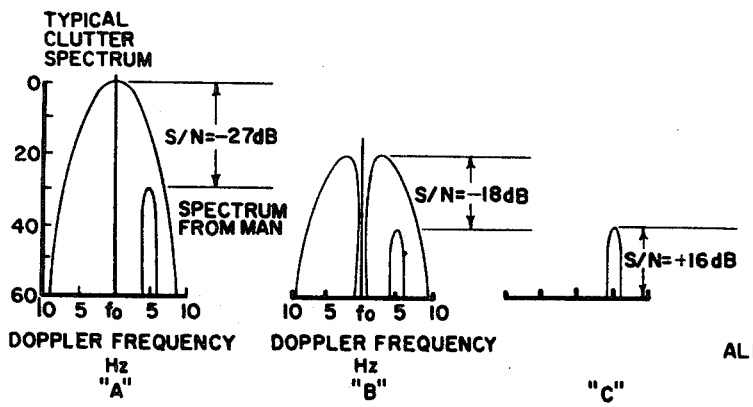
FIG. 3 is a graphical representation of the typical signal to noise improvement achieved by the present invention.

FIG. 3 is illustrative of a typical "signal to noise" improvement of a subclutter, coherent, pulsed doppler radar system employing the present invention. The values are taken from a 15 meter range bin at a 300 meter radius. "A" shows a typical clutter spectrum and "man" spectrum as received, the signal to noise ratio being −27db. "B" shows the ratio after the return signal has passed through the synchronous notch filter, the signal to noise ratio then being −18db., while "C" shows the effect of the clutter canceler wherein the ratio is +16db., or a total improvement of 43db.

Figure 4:
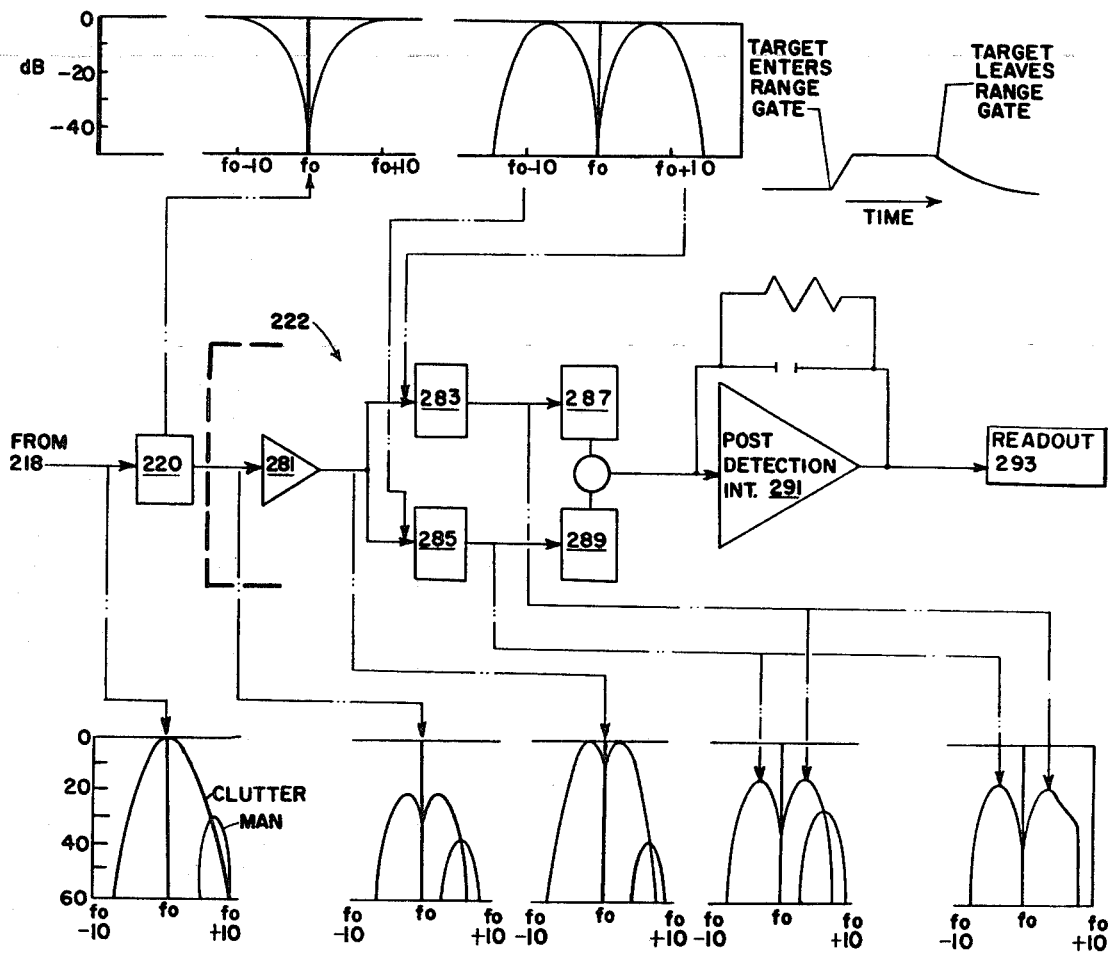
FIG. 4 is a graphical, schematic representation similar to FIG. 3, in relation to the components of the specific doppler processor of FIG. 2.

FIG. 4 pictorially illustrates the same result employing the canceler system of FIG. 2. The doppler spectrum is shown on the bottom as it leaves the receiver 218, after passing the synchronous notch filter 220 and in the canceler 222 where it is amplified at 281, the narrow band-pass filters 283, 285, the resultant signal being detected and integrated at 287, 289, the summation of the signals at 291 indicating an intruder at 293.

In summary, the present invention makes possible for the first time a means by which objects having continuous radial motion which may be submerged in or obscured by clutter may be readily and accurately detected, regardless of the degree or intensity of the clutter, by discriminating against those signals from fixed and "fixed but pliable" objects containing doppler information.

We claim:
1. A system for detecting doppler signals submerged in clutter, comprising:
   A. means generating energy;
   B. means transmitting energy;
   C. means receiving echo energy from approaching and receding targets containing doppler information;
   D. means simultaneously processing the doppler spectrum from the approaching and receding targets contained in the received echo energy to produce a signal proportional to net target motion.
2. The system defined by claim 1 wherein:
   A. said energy generating means produces coherent RF energy; and
   B. said processing means comprises:
      1. means precisely extracting the doppler spectrum of said echo while maintaining separate identity of the positive and negative doppler frequencies;
      2. means cancelling the doppler spectrum of equal but opposite sense contained in the received echo to produce a signal proportional to net target motion.
3. The system defined by claim 2 wherein said cancelling means comprises:
   A. means separating the upper and lower sidebands of the doppler spectrum;
   B. means operative to cause the separated sidebands to be detected and integrated and operative to readout any resultant signal.
4. The system defined by claim 3 wherein:
   A. said generating means produces pulsed RF energy and comprises:
      1. synthesizer means providing basic coherent signals for said transmitter means and said receiving means;
      2. timing means establishing the pulse repetition frequency for said transmitting means and the range gate timing pulse for said receiving means;
      3. clock means providing basic coherent signals for said synthesizer means, said doppler spectrum extracting means and said cancelling means;

B. said transmitting means having gating and amplifying means responsive to said timing means operative to establish the transmitted pulse of the coherent signal from said synchronizer means;

C. said echo receiving means converting the returned RF signal to a modulated, bipolar video signal retaining all doppler information of the RF echo signal, stretching the video pulses in time to cover the entire pulse repetition period emphasizing the fundamental of the modulation frequency and eliminating harmonics of the timing means pulse repetition frequency;

D. said doppler spectrum extracting means rejecting stationary target return signals received from said receiving means and passing target return signals exhibiting a doppler shift, the extracting reference frequency established by a basic coherent signal from said clock means.

5. The system defined by claim 4 wherein said means separating the sidebands of the doppler spectrum are controlled by said clock means to maintain the center frequency of said sideband separating means an absolute value on either side of a reference frequency, and said detection and integration means includes means which indicates if the summation over the integration period is not zero.

6. The system defined by claim 4 wherein said means separating the sidebands of the doppler spectrum are controlled by said clock means, means velocity weighting each sideband and said detection and integration means includes means integrating the velocity weighted sideband spectrum with respect to time so that the output is proportional to the summation of the cross section of all targets and their displacement.

7. The device defined by claim 1 wherein:
A. said generating means produces pulsed, coherent RF energy and comprises:
 1. a synthesizer means providing three basic coherent signals and generating (1) a transmitter signal absolutely stabilized at the frequency to be transmitted, (2) a local oscillator signal absolutely stabilized at a frequency offset from the transmitter frequency by the IF reference frequency and (3) a phase detector reference signal absolutely stabilized at a frequency offset from the IF reference, the IF reference and the phase detector reference phase locked to the reference frequencies for said processing means;
 2. a timer means comprising a pulse repetition frequency generator and a range gate generator providing the timing pulse for a range gate in said receiver means; and
 3. clock means providing filter and canceler reference signals;
B. said transmitter means comprises means to gate and amplify the continuous wave transmitter signal at the pulse repetition frequency established by said timer;
C. said echo energy receiving means converts the returned RF energy to an IF signal retaining all doppler information contained in the return signal, and comprising
 1. a mixer operative to mix the return signal with the local oscillator signal from said synthesizer to produce an IF frequency;
 2. a range gate gated by the timing pulse from said range gate generator;
 3. a phase detector using the phase detector reference signal from said synthesizer and producing a modulated, bipolar video signal;
 4. a boxcar generator operative to stretch the video signal in time to cover substantially the entire pulse repetition period;
D. said processing means comprises:
 1. a doppler signal filter means passing only those signals exhibiting a doppler shift;
 2. a canceler means processing the passed signal from said extracting means to produce a signal proportional to net target motion, and comprising:
  a. means separating the upper and lower sidebands, said means controlled by said clock means;
  b. means detecting and determinating the inequality of the separated sidebands;
  c. means integrating the detected signal with respect to time to provide a signal indicating presence, location and direction of motion of the target.

8. The detection device defined by claim 7 wherein:
A. said canceler means comprises:
 1. plural phasing type demodulators whose reference signal is a coherent signal derived from said clock and displaced by 90° in phase, the sidebands representing a function of the size and amplitude of targets versus frequency;
 2. plural high pass filters, a detector detecting any signal passed by each said high pass filter, and a log ratio amplifier operative to cause the doppler spectrum in each sideband to be velocity weighted;
 3. an integrator operative to integrate the sideband with respect to time so that the output will be proportional to the summation of the cross section of all targets and their displacement.

9. The detection device defined by claim 7 wherein:
said canceler means comprises:
A. plural narrow band-pass digital filters for receiving the signal passed by said doppler spectrum filter means dependent on the relative magnitude of the passed signal; the center frequency of the said digital filters controlled and established by said clock means;
B. detector and integrator means for each said digital filter detecting and integrating the outputs of said digital filters;
C. a summation amplifier summing the signal output of said detector and integration means; and
D. readout means responsive to any signal from said summation amplifier which is larger, in either sense, than a preselected value.

10. In a system detecting amplitude and frequency of a returned signal containing doppler information, the means for cancelling signal information resulting from fixed but pliable movement while retaining that resultant from continuous radial motion, comprising:
A. means separating the sidebands of the returned doppler information containing signal;
B. means detecting and integrating the separated sidebands to produce a signal proportional to net target motion;
C. clock means establishing and controlling the center frequency of said sideband separating means to maintain the center frequency of said sideband separating means an absolute value on either side of the center frequency.

11. The means defined by claim 10 including a filter means having a filter center frequency established and controlled by said clock means rejecting stationary target return signals.

12. The method of detecting in a target area an object having continuous radial motion which is obscured by objects exhibiting fixed but pliable movement comprising:
A. detecting the amplitude and frequency of a returned signal containing doppler information from the target area;
B. separating the sidebands of the detected return signal by establishing a center reference frequency so that the sidebands represent a function of the amplitude of all targets exhibiting motion versus frequency;
C. velocity weighting the doppler spectrum in each separated sideband;
D. integrating the spectrum with respect to time to obtain a signal which is proportional to the summation of the cross section and displacement of all target signals exhibiting a doppler shift so that the summation of the two sidebands will cancel to a predictable level over the integration period where objects in the target area are fixed but pliable but where objects exhibit continuous radial motion the signal return will add only to one of the sidebands.

13. The method defined by claim 12, including the additional step prior to separating the sidebands of filtering the returned signal to remove any signal not exhibiting a doppler shift.